US008850605B2

(12) United States Patent
Koka et al.

(10) Patent No.: US 8,850,605 B2
(45) Date of Patent: *Sep. 30, 2014

(54) SYSTEM AND METHOD FOR CAPACITY LICENSING

(71) Applicant: Flexera Software LLC, San Jose, CA (US)

(72) Inventors: Vikram Venkata Koka, Fremont, CA (US); Ann Shvarts, San Jose, CA (US)

(73) Assignee: Flexera Software LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,484

(22) Filed: Jan. 22, 2014

(65) Prior Publication Data

US 2014/0136426 A1    May 15, 2014

Related U.S. Application Data

(63) Continuation of application No. 12/564,820, filed on Sep. 22, 2009.

(51) Int. Cl.
*G06Q 10/00* (2012.01)
*G06F 21/24* (2006.01)
*G06Q 50/18* (2012.01)
*G06F 21/70* (2013.01)
*G06F 21/10* (2013.01)

(52) U.S. Cl.
CPC .............. *G06Q 50/184* (2013.01); *G06F 21/70* (2013.01); *G06Q 10/00* (2013.01); *G06F 21/105* (2013.01)
USPC ................................ 726/29; 705/59; 705/310

(58) Field of Classification Search
CPC ................. G06F 21/10; G06F 21/105; G06F 2221/2141; G06F 8/60; G06F 21/70; H04L 2463/101; H04L 67/34; H04M 15/43; G06Q 50/184; G06Q 10/00
USPC ........................... 726/26, 29, 30; 705/59, 310
See application file for complete search history.

(56) References Cited

U.S. PATENT DOCUMENTS

| | | | |
|---|---|---|---|
| 5,940,504 A | 8/1999 | Griswold | |
| 6,189,146 B1 | 2/2001 | Misra et al. | |
| 7,752,139 B2 | 7/2010 | Hu | |
| 7,890,428 B2 * | 2/2011 | Brooks et al. ................... | 705/59 |
| 7,900,243 B2 | 3/2011 | Ramakrishna et al. | |
| 8,103,804 B2 | 1/2012 | Koka et al. | |
| 8,126,814 B2 * | 2/2012 | Yellai et al. ..................... | 705/59 |
| 8,510,226 B2 | 8/2013 | Coley et al. | |
| 2003/0018491 A1 | 1/2003 | Nakahara et al. | |
| 2003/0028454 A1 | 2/2003 | Ooho et al. | |

(Continued)

OTHER PUBLICATIONS

U.S. Appl. No. 12/564,820; Office Action mailed Mar. 25, 2014.

(Continued)

*Primary Examiner* — Catherine Thiaw
(74) *Attorney, Agent, or Firm* — Lewis Roca Rothgerber LLP

(57) ABSTRACT

A method and system for capacity licensing are disclosed. According to one embodiment, a computer implemented method comprises receiving a capability request from a device, sending a capability response to the device, the capability response comprising a serving of license rights. A deduction record is stored, the deduction record deducting a license from a license pool. An information request is received from the device, and an information response is sent.

21 Claims, 10 Drawing Sheets

(56) References Cited

U.S. PATENT DOCUMENTS

| | | | |
|---|---|---|---|
| 2003/0032406 A1 | 2/2003 | Minear et al. | |
| 2004/0010440 A1 | 1/2004 | Lenard et al. | |
| 2004/0054930 A1 | 3/2004 | Walker et al. | |
| 2004/0143746 A1 | 7/2004 | Ligeti et al. | |
| 2005/0027657 A1* | 2/2005 | Leontiev et al. | 705/59 |
| 2005/0044546 A1 | 2/2005 | Niebling et al. | |
| 2005/0125359 A1* | 6/2005 | Levin et al. | 705/59 |
| 2006/0106728 A1* | 5/2006 | Yellai et al. | 705/59 |
| 2006/0116966 A1* | 6/2006 | Pedersen et al. | 705/59 |
| 2006/0143131 A1 | 6/2006 | Baratti et al. | |
| 2006/0223503 A1 | 10/2006 | Muhonen et al. | |
| 2006/0265337 A1 | 11/2006 | Wesinger | |
| 2006/0294020 A1 | 12/2006 | Pence et al. | |
| 2007/0107067 A1* | 5/2007 | Fountian | 726/33 |
| 2007/0130081 A1 | 6/2007 | Coley et al. | |
| 2007/0198429 A1 | 8/2007 | Coley et al. | |
| 2007/0219917 A1* | 9/2007 | Liu et al. | 705/59 |
| 2008/0114692 A1* | 5/2008 | Jogand-Coulomb et al. | 705/59 |
| 2008/0222044 A1 | 9/2008 | Gottlieb et al. | |
| 2008/0244754 A1 | 10/2008 | Curren | |
| 2008/0307253 A1 | 12/2008 | Bartley et al. | |
| 2008/0313264 A1 | 12/2008 | Pestoni | |
| 2009/0038018 A1 | 2/2009 | Mikami | |
| 2009/0119779 A1 | 5/2009 | Dean et al. | |
| 2009/0187995 A1 | 7/2009 | Lopatic | |
| 2009/0328225 A1 | 12/2009 | Chambers et al. | |
| 2010/0057674 A1* | 3/2010 | O'Donnell | 707/3 |
| 2010/0293622 A1 | 11/2010 | Nikitin et al. | |
| 2010/0299723 A1 | 11/2010 | Holloway | |
| 2010/0333212 A1 | 12/2010 | Carpenter et al. | |
| 2011/0072522 A1 | 3/2011 | Koka | |
| 2012/0041878 A1* | 2/2012 | Yim | 705/44 |
| 2012/0143766 A1* | 6/2012 | Zheng et al. | 705/59 |
| 2012/0254047 A1* | 10/2012 | Dwivedi et al. | 705/310 |

OTHER PUBLICATIONS

U.S. Appl. No. 12/564,820; Final Office Action mailed Sep. 21, 2012.
U.S. Appl. No. 12/564,820; Office Action mailed Mar. 15, 2012.

* cited by examiner

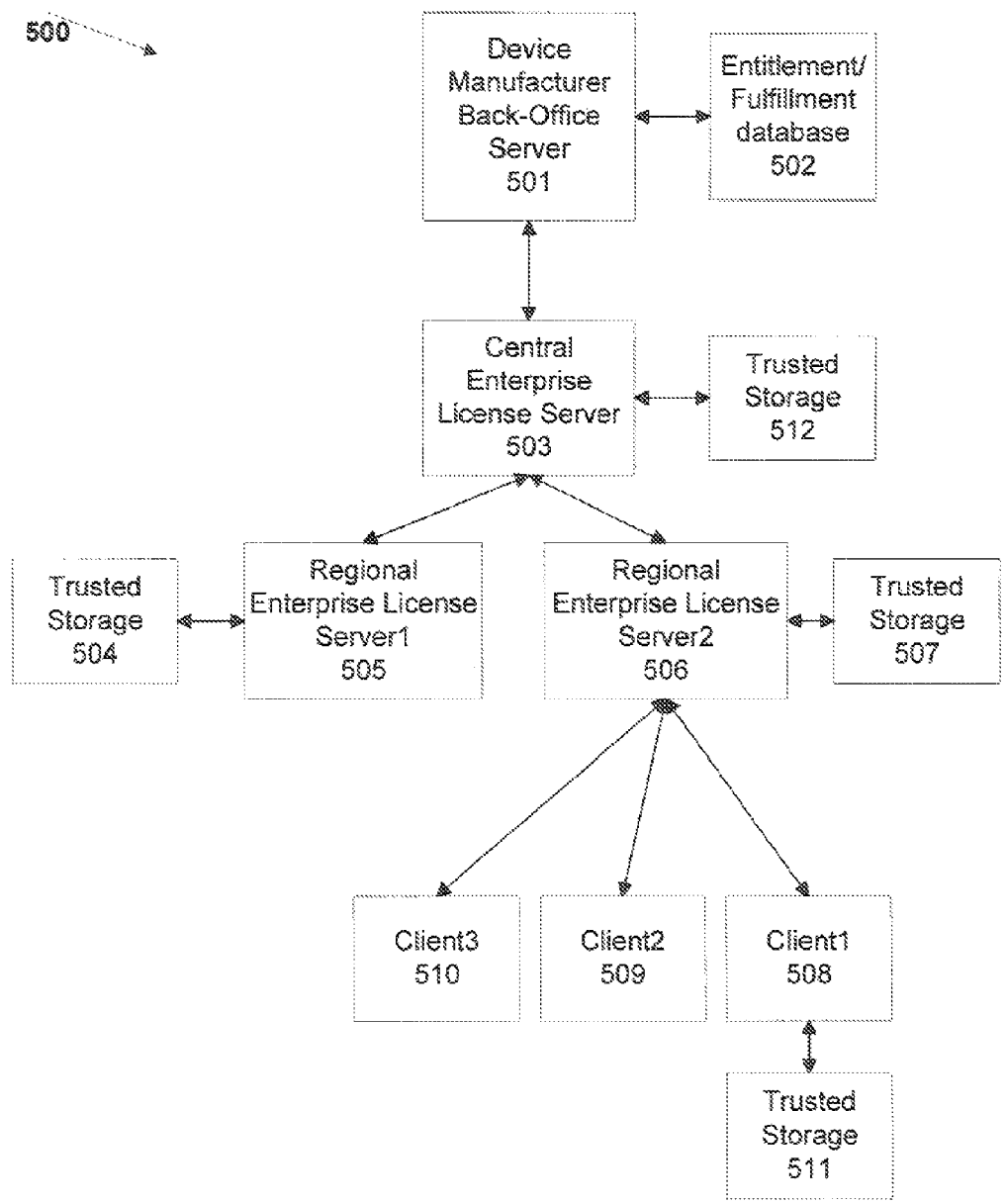

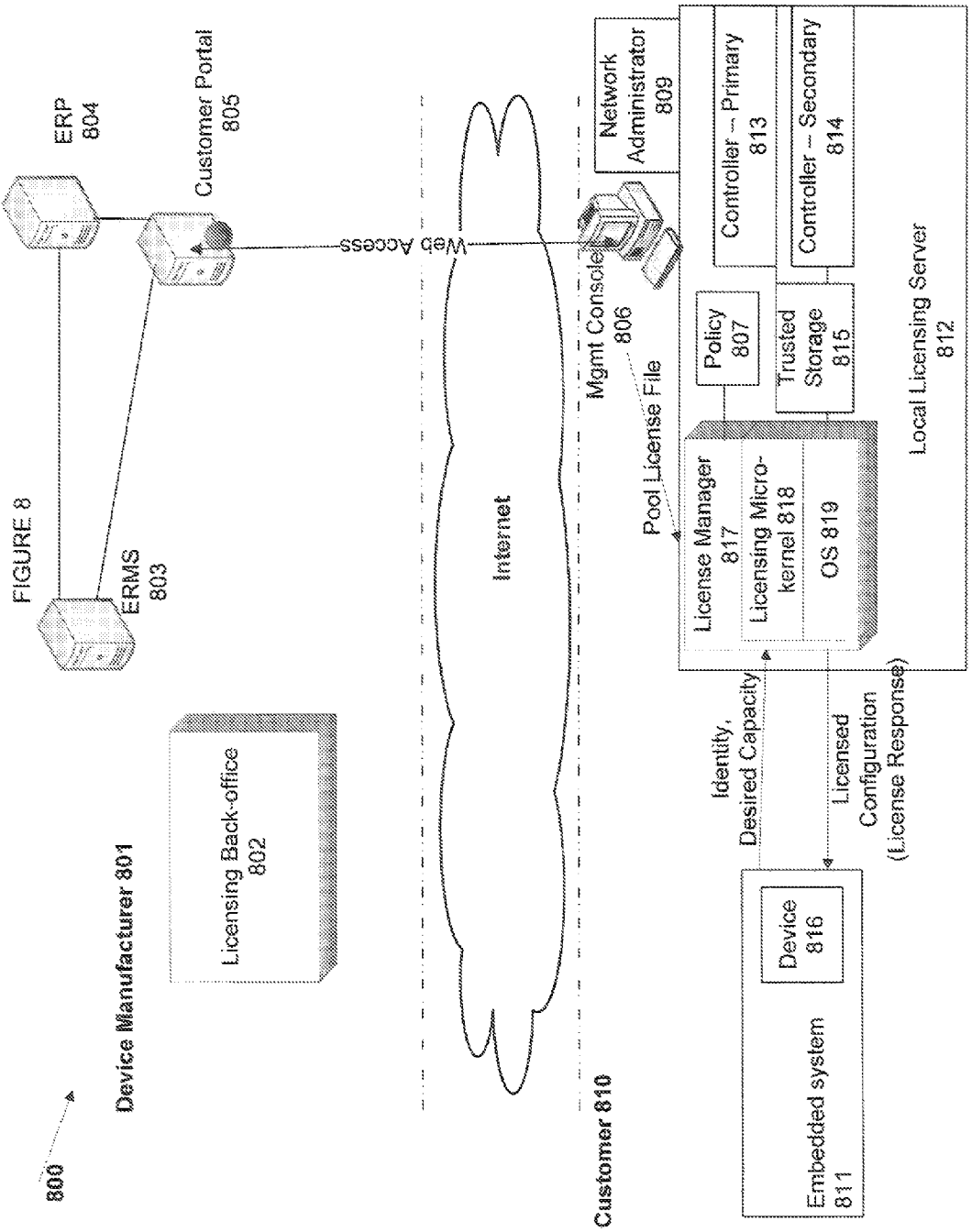

SYSTEM AND METHOD FOR CAPACITY LICENSING

CROSS-REFERENCE TO RELATED APPLICATIONS

The present application is a continuation and claims the priority benefit of U.S. patent application Ser. No. 12/564,820 filed Sep. 22, 2009, the disclosure of which is incorporated herein by reference.

BACKGROUND OF THE INVENTION

1. Field of the Invention

The present invention relates generally to electronic devices and more particularly to a method and a system for capacity licensing.

2. Description of the Related Art

Device manufacturers commonly sell devices differentiated by the capabilities they offer, for example the same device may be sold with fewer capabilities or with additional or more sophisticated capabilities. In terms of licensing, rights are defined on a host and licensed software gets tied to a hardware identity. Issues arise, however, when a customer purchases a significant number of devices and would like to keep licenses for the devices in a pool so as to provide different features when necessary or desired.

Existing systems utilize public-key cryptography to serve licenses to an end-device, wherein a private-key is used at the server which is stored at a publisher or manufacturer. In the scenario described previously, involving a customer purchasing a significant number of devices, the customer becomes the license manager. This places both the end device and license issuing authority in a potentially 'hostile domain.'

SUMMARY OF THE PRESENTLY CLAIMED INVENTION

A method and system for capacity licensing are disclosed. According to one embodiment, a computer implemented method comprises receiving a capability request from a device, sending a capability response to the device, the capability response comprising a serving of license rights. A deduction record is stored, the deduction record deducting a license from a license pool. An information request is received from the device, and an information response is sent.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

FIG. 5 is a system level diagram of an exemplary enterprise capacity licensing system, according to one embodiment.

FIG. 8 is a system level diagram of an exemplary capacity licensing system utilizing redundant controllers, according to one embodiment.

DETAILED DESCRIPTION

Figure 1:
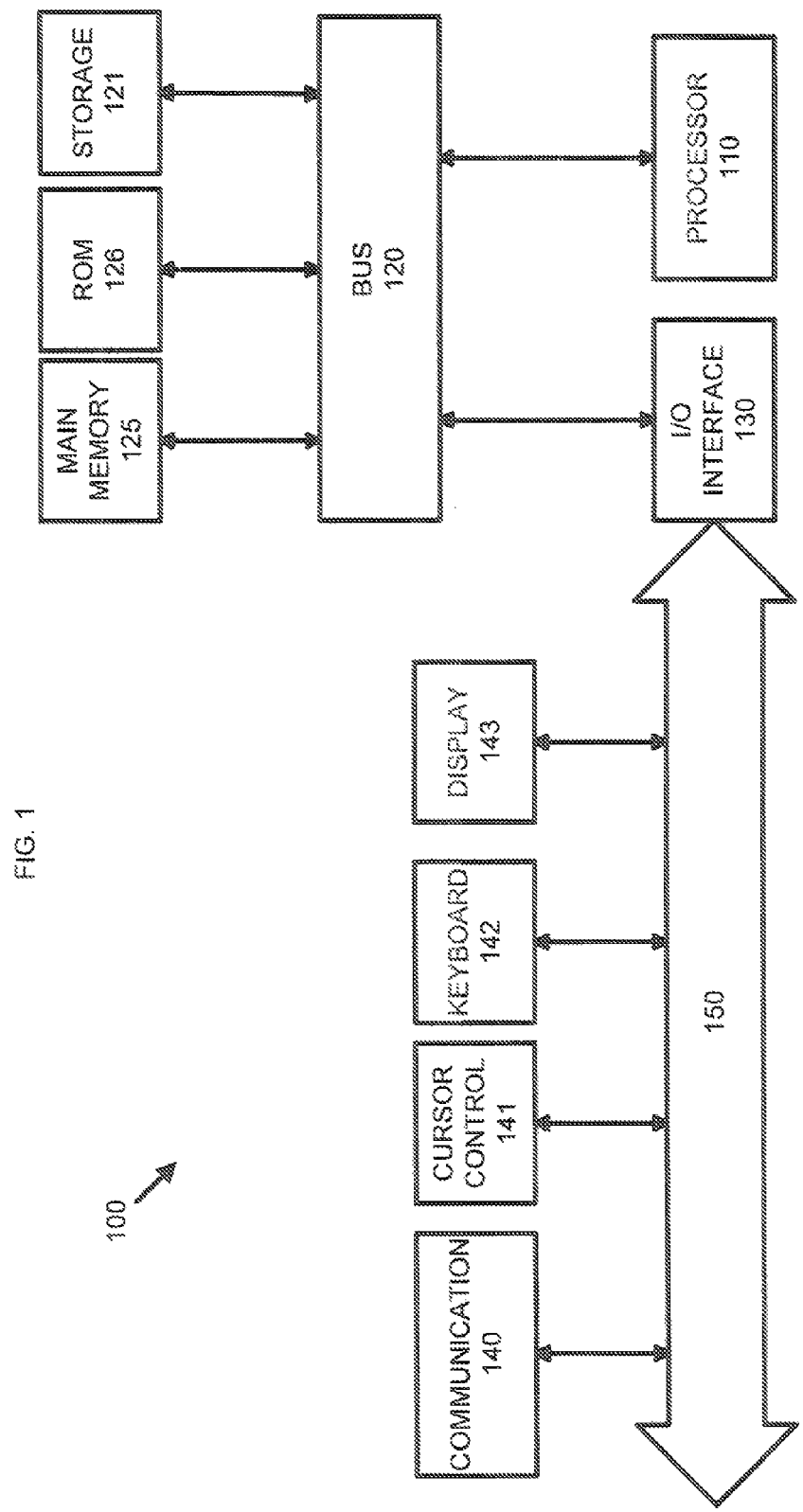
FIG. 1 illustrates an exemplary computer architecture for use with the present system, according to one embodiment.

A method and system for capacity licensing are disclosed. According to one embodiment, a computer implemented method comprises receiving a capability request from a device, sending a capability response to the device, the capability response comprising a serving of license rights. A deduction record is stored, the deduction record deducting a license from a license pool. An information request is received from the device, and an information response is sent.

In an enterprise device and licensing scenario, an enterprise has license servers with licenses in trusted storage and need disaster recovery. Devices are enabled based on needed and desired capacity, which delivers flexibility to service providers.

The licensing information data must be backed up periodically to ensure that in the case of catastrophic hardware failure the data containing license information are not lost. However, duplication of the licensing data should not lead to the availability of extra licenses.

According to one embodiment of the present system, device license rights are verified against a "server" of the license rights as part of the usage of the license rights, as opposed to relying upon the common "binding" of license rights to the physical characteristics of the device.

Terms used in the following description include the following:

Trusted storage: a secure storage of data including information regarding the identity of a device and what rights have been issued to the device. Trusted storage can be on a server and a device.

Planned license deployment: deployment of license capabilities when desired capabilities for devices are known in advance and the deployment is planned.

Dynamic license deployment: deployment of license capabilities on a dynamic basis, wherein desired capabilities for particular devices changed based on demand, as an example.

License pooling: pooling together available licenses rather than fixing each available license to a particular device.

Pool license file: a file including licenses available to be served.

Deduction record: a record in the server trusted storage indicating that a license has been served to a particular device.

Borrow interval: the amount of time during which a device may utilize a particular license.

Renew interval: amount of time after which a device must check-in with a license server to renew license capabilities.

Virtual appliance: a device characterized by hardware without writable storage.

According to one embodiment of the present system, a licensing service verifies current fulfillment records (fulfilled licenses) within trusted storage (secure data storage) against the parent server in a license activation chain over a periodic interval. The verification can be for ensuring validity of fulfillment records and to propagate information regarding the current status of fulfillments.

According to one embodiment, devices and servers periodically "check-in" with their respective parent license servers. The "check-in" period is defined by a manufacturer or network administrator, according to one embodiment. The "check-in" process can be put in place for necessary renewal of license rights, according to one embodiment.

According to one embodiment, a device is a virtual appliance. A virtual appliance is characterized by hardware without writable storage. The virtual device does not store a configuration or license capacity in local trusted storage, instead upon power-on and power-off the virtual device communicates with a provisioning system to learn a configuration and licensing capabilities. A virtual appliance has a short renew (or "check-in") interval, an example of which might be once an hour, due to its lack of memory.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. A method is here, and generally, conceived to be a self-consistent process leading to a desired result. The process involves physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present method and system also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the method and system as described herein.

FIG. 1 illustrates an exemplary computer architecture for use with the present system, according to one embodiment. One embodiment of architecture 100 comprises a system bus 120 for communicating information, and a processor 110 coupled to bus 120 for processing information. Architecture 100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Architecture 100 also may include a read only memory (ROM) and/or other static storage device 126 coupled to bus 120 for storing static information and instructions used by processor 110.

A data storage device 127 such as a magnetic disk or optical disc and its corresponding drive may also be coupled to computer system 100 for storing information and instructions. Architecture 100 can also be coupled to a second I/O bus 150 via an I/O interface 130. A plurality of I/O devices may be coupled to I/O bus 150, including a display device 143, an input device (e.g., an alphanumeric input device 142 and/or a cursor control device 141).

The communication device 140 allows for access to other computers (servers or clients) via a network. The communication device 140 may comprise one or more modems, network interface cards, wireless network interfaces or other well known interface devices, such as those used for coupling to Ethernet, token ring, or other types of networks.

Figure 2:
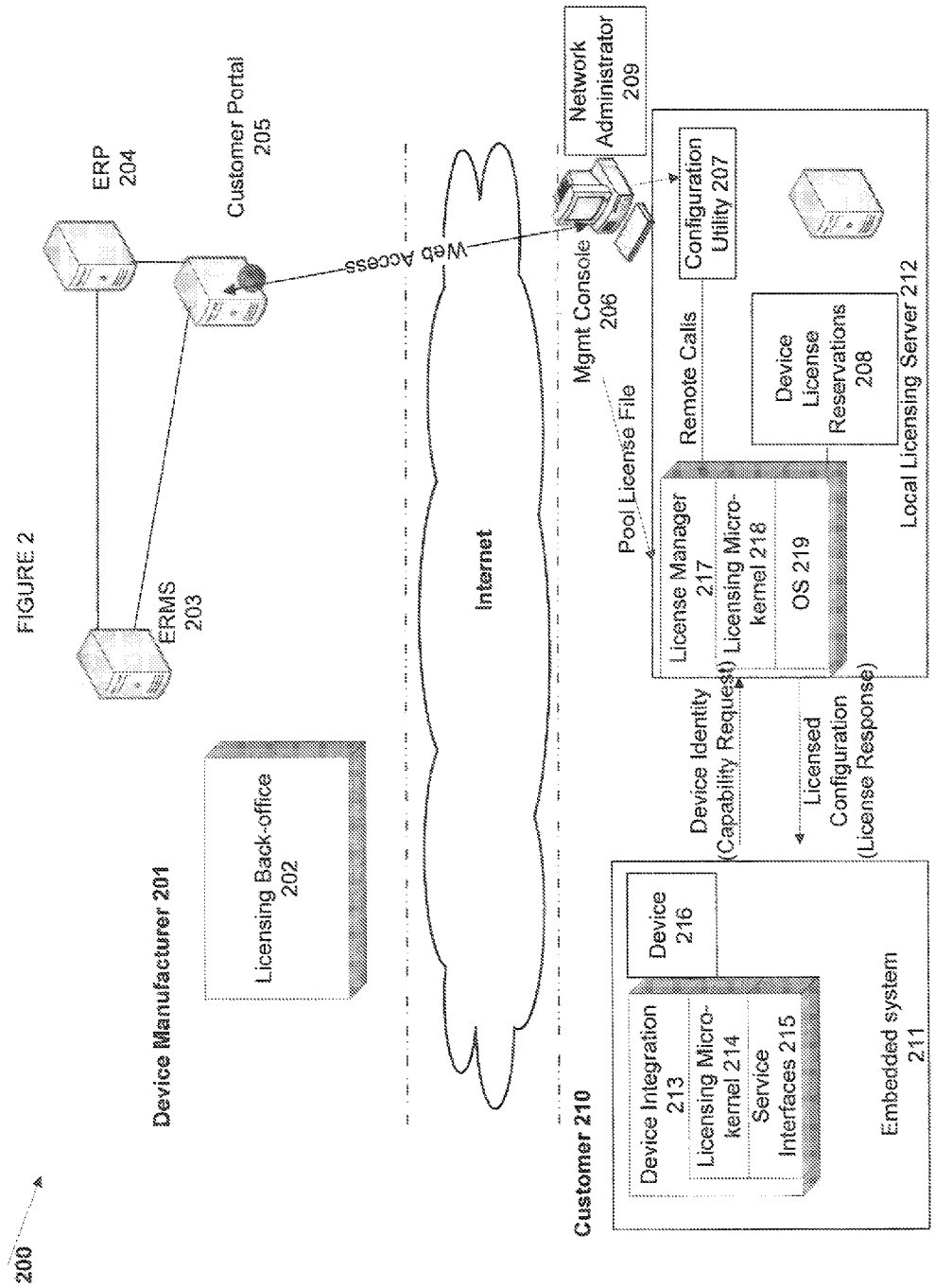
FIG. 2 is a system level diagram of an exemplary capacity licensing system utilizing planned license deployment, according to one embodiment.

FIG. 2 is a system level diagram of an exemplary capacity licensing system utilizing planned license deployment, according to one embodiment. Planned license deployment occurs when the license capabilities have been decided upon in advance and can be deployed to the devices at once. A capacity license system 200 includes a device manufacturer 201 that grants licensing rights to a customer 210 having one or more embedded systems 211. An embedded system 211 includes a device 216 and a client architecture. The client architecture includes device integration 213, a licensing micro-kernel 214, and service interfaces 215. Device integration 213 includes enabling communication between the embedded system 211 and other system entities. A licensing micro-kernel 214 handles license rights. Service interfaces 215 can include interfaces for system time and device identity, according to one embodiment.

A network administrator 209 utilizes a management console 206 to access a customer portal 205 hosted by the device manufacturer 201. The device manufacturer 201 has a licensing back-office 202. Through the customer portal 205 capabilities can be requested by communicating with the resource planner (ERP) 204 and submitting payment for the requested capabilities. The capabilities desired may be initial functional capabilities for the embedded system 211 and they may also be an upgrade in functionality for an already deployed embedded system 211. The resource planner (ERP) 204 communicates the entitlements for the embedded system 211 to the entitlement relationship management system (ERMS) 203. A local licensing server 212 includes a license manager 217, a license server micro-kernel 218, and an operating system (OS) 219. A license manager 217 and licensing micro-kernel 218 handle license rights. The local licensing server 212 stores device license reservations 208 which are defined by the network administrator 209. The management console 206 communicates a pool license file (licenses to be served) to the local licensing server 212 and communicates configurations to a configuration utility 207 on the local licensing server.

Figure 3:
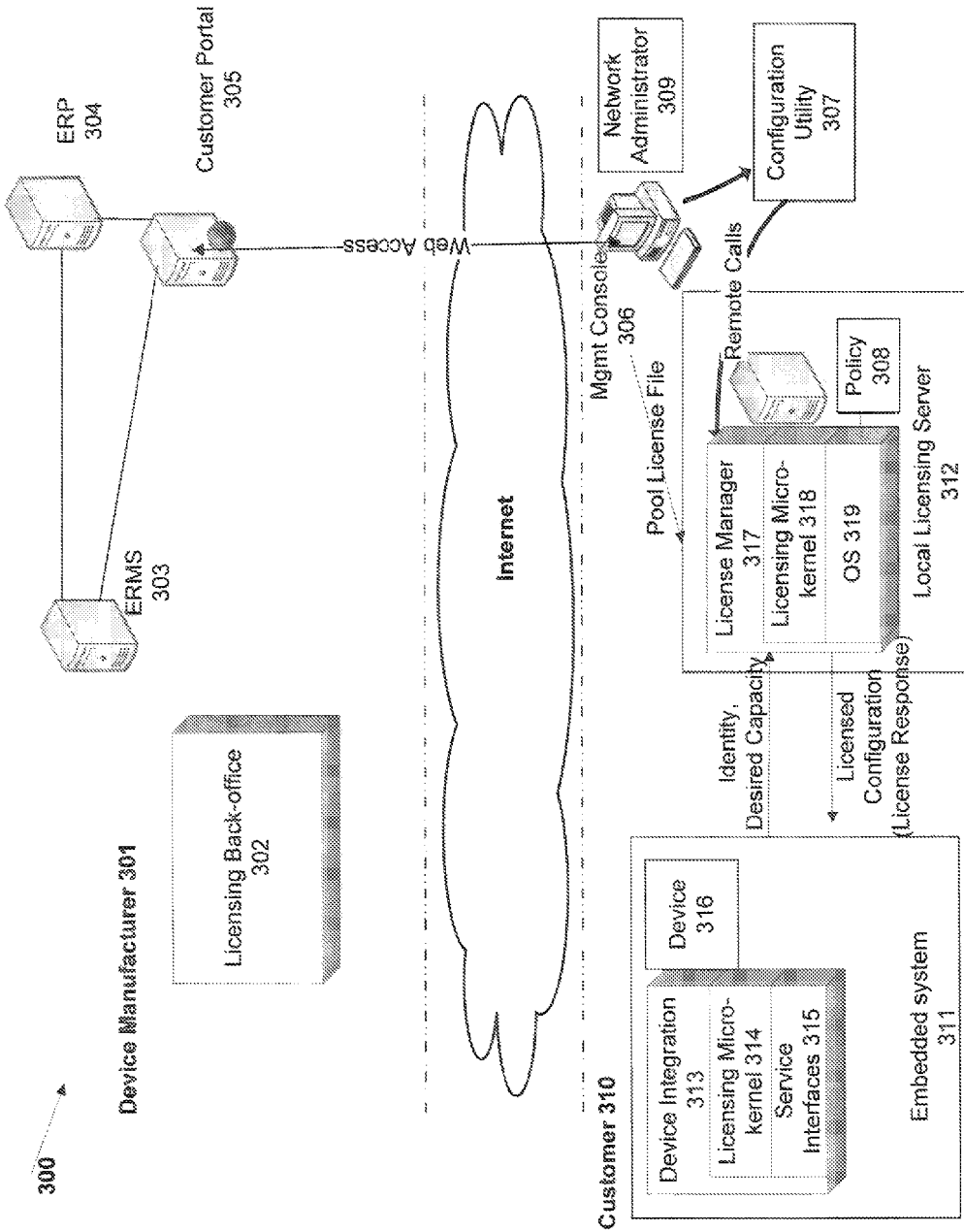
FIG. 3 is a system level diagram of an exemplary capacity licensing system utilizing dynamic license deployment, according to one embodiment.

The device integration 213 within the embedded system 211 communicates a device identity or capability request to the local licensing server 212, and the local licensing server 212 responds with a licensed configuration or license response based on the device license reservations 208:

FIG. 3 is a system level diagram of an exemplary capacity licensing system utilizing dynamic license deployment, according to one embodiment. Dynamic license development provides flexibility in determining what license capabilities are assigned to devices. If the desired license capabilities change, the license deployment can be changed. A capacity licensing system 300 includes a device manufacturer 301, having a licensing back-office 302, that grants licensing rights to a customer 310 having one or more embedded systems 311. An embedded system 311 includes a device 316 and a client architecture. The client architecture includes device integration 313, a licensing micro-kernel 314, and service interfaces 315. Device integration 313 includes enabling communication between the embedded system 311 and other system entities. A licensing micro-kernel 314 handles license rights. Service interfaces 315 can include interfaces for system time and device identity, according to one embodiment.

A network administrator 309 utilizes a management console 306 to access a customer portal 305 hosted by the device manufacturer 301. Through the customer portal 305 capabilities can be requested by communicating with the resource planner (ERP) 304 and submitting payment for the requested capabilities. The capabilities desired may be initial functional capabilities for the embedded system 311 and they may also be an upgrade in functionality for an already deployed embedded system 311. The resource planner (ERP) 304 communicates the entitlements for the embedded system 311 to the entitlement relationship management system (ERMS) 303.

A local licensing server 312 includes information related to policy 308, a license manager 317, a licensing micro-kernel 318, and an operating system (OS) 319. A license manager 317 and licensing micro-kernel 318 handle license rights.

The management console 306 communicates a pool license file (licenses to be served) to the local licensing server 312, as well as configurations to a configuration utility 307. The configuration utility 307 remotely communicates with the local licensing server 312 license manager.

The device 316 within the embedded system 311 communicates a device identity and desired capacity to the local licensing server 312, and the local licensing server 312 responds with a licensed configuration or license response based on set policy 308. The policies 308 are defined by a manufacturer or network administrator, according to one embodiment.

Figure 4:
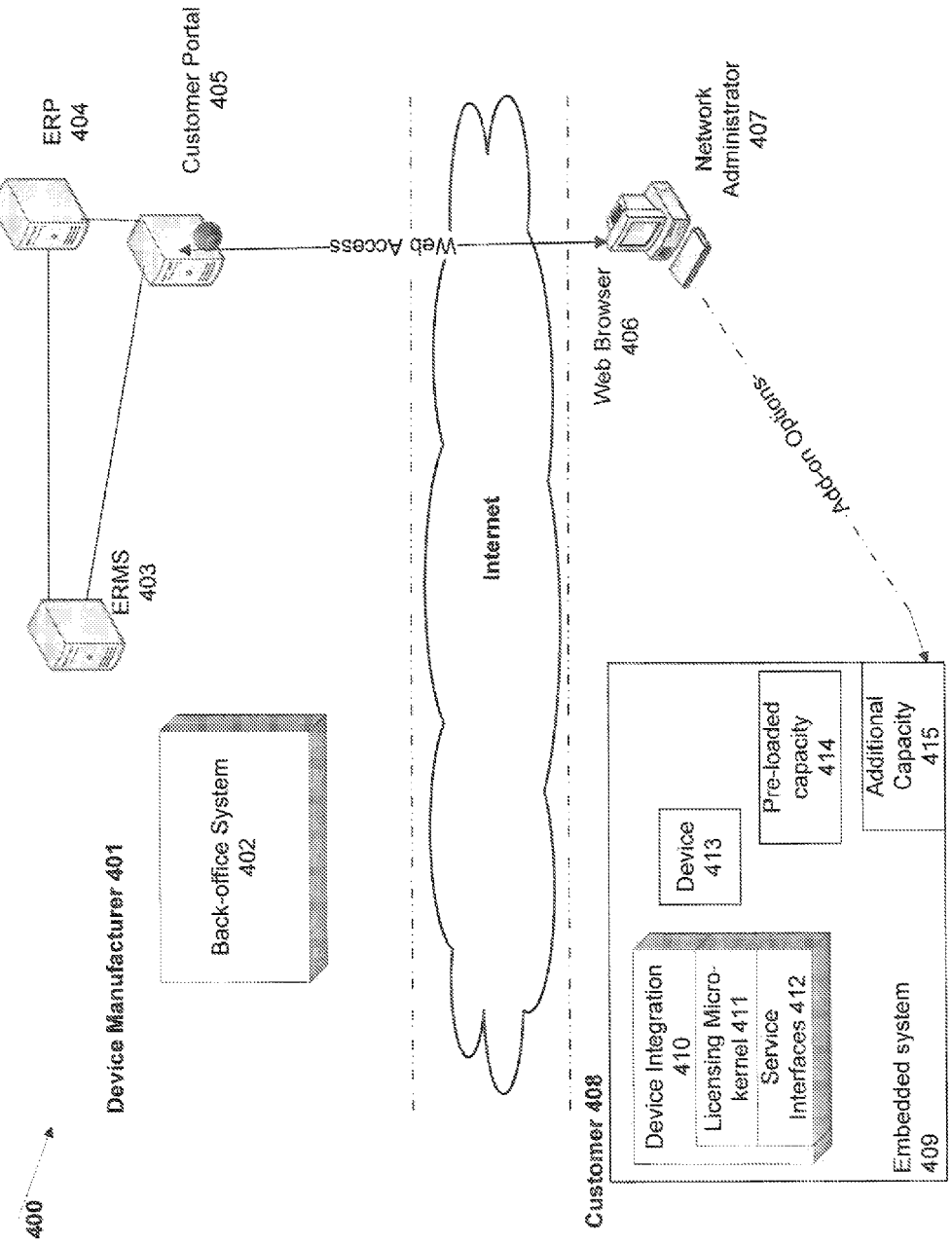
FIG. 4 is a system level diagram of an exemplary capacity licensing system utilizing client license pooling, according to one embodiment.

FIG. 4 is a system level diagram of an exemplary capacity licensing system utilizing client license pooling, according to one embodiment. Client license pooling involves license deployment via virtual appliances. A capacity licensing system 400 includes a device manufacturer 401, having a back-office system 402, that grants licensing rights to a customer 408 having one or more embedded systems 409. An embedded system 409 includes a device and a client architecture. The client architecture includes device integration 410, a licensing micro-kernel 411, and service interfaces 412. Device integration 413 includes enabling communication between the embedded system 411 and other system entities. A licensing micro-kernel 414 handles license rights. Service interfaces 415 can include interfaces for system time and device identity, according to one embodiment. The embedded system 409 also has a pre-loaded capacity 414 and may have additional capacity 415.

A network administrator 407 utilizes a web browser 406 to access a customer portal 405 hosted by the device manufacturer 401. Through the customer portal 405 additional capabilities can be requested by communicating with the resource planner (ERP) 404 and submitting payment for the requested capabilities. The capabilities desired may be initial functional capabilities for the embedded system 409 and they may also be an upgrade in functionality for an already deployed embedded system 409. The resource planner (ERP) 404 communicates the entitlements for the embedded system 411 to the entitlement relationship management system (ERMS) 403. The network administrator 407 communicates additional capabilities or capacity to the embedded system 409. The additional capacity can be delivered using virtual appliances on rack servers, as is explained below with regard to FIG. 10.

FIG. 5 is a system level diagram of an exemplary enterprise capacity licensing system, according to one embodiment. A capacity licensing system 500 includes a device manufacturer back-office server 501 that can be in one geographic location. The capacity licensing system 500 can also include a central enterprise license server 503 can be in a geographic location other than where the back-office server 501 resides. The device manufacturer back-office server 501 is in communication with an entitlement and fulfillment database 502. The entitlement and fulfillment database 502 contains license and capability information for a number of devices.

The central enterprise license server 503 has trusted storage 512, the trusted storage 512 containing device license and capability information loaded from the device manufacturer back-office server 501. One or more regional enterprise license servers (505, 506) can exist in the system 500, each having a respective trusted storage (504, 507). Trusted storage (504, 507) at the regional enterprise license servers (505, 506) includes license and capability information provided by the central enterprise license server 503.

One or more clients (508, 509, 510) are in communication with a regional enterprise license server 506. A client 509 includes trusted storage 511, the trusted storage including license and capability information provided by the client's 509 respective regional enterprise license server 506.

In other words, capacity licensing transactions occur between a client 509 and a regional enterprise license server 506, between a regional enterprise license server 506 and a central enterprise license server 503, and between a central enterprise license server 503 and a device manufacturer back-office server 501.

In the exemplary capacity licensing system 500, if a client machine 508 completely fails its trusted storage 511 can be restored by the regional enterprise license server 506. If a complete failure of the regional enterprise license server 506 occurs, its trusted storage 507 can be restored by the central enterprise license server 503, its client machine(s) (508, 509, 510), and any other sibling regional enterprise license server(s) (505, in this example). If a complete failure of the central enterprise license server 503 occurs, its trusted storage 512 can be restored by the device manufacture back-office server 501, the regional enterprise license server(s) (505, 506), and any other central enterprise license server siblings, if they exist. This correction or recovery of license rights can be manual or automatic.

Figure 6A:
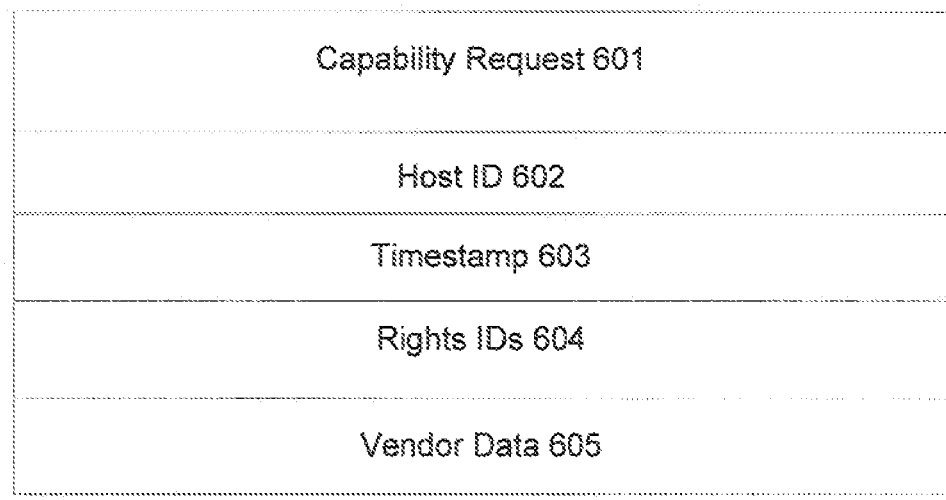
FIG. 6A illustrates an exemplary capability request in a capacity licensing system, according to one embodiment.

FIG. 6A illustrates an exemplary capability request in a capacity licensing system, according to one embodiment. A capability request 601 includes a host identifier 602, a timestamp 603, rights identifiers 604, and vendor data 605. The timestamp 603 is the time of the last processed capability response. The capability request 601, can also include information related to current license rights, according to one embodiment. A capability request 601 asks the server to evaluate license rights available on the server together with the data provided by the license administrator (a license reservation list and/or license policy) and the client (rights ids 604 and vendor data 605 from the request) to find out the best set of license rights that can be served to the client.

Figure 6B:
FIG. 6B illustrates an exemplary renew capability request in a capacity licensing system, according to one embodiment.

FIG. 6B illustrates an exemplary renew capability request in a capacity licensing system, according to one embodiment. A renew capability request 606 is a lightweight version of the capability request 601 of FIG. 6A as it has a host identifier 607 and a timestamp 608. The timestamp 608 marks the last processed capability response. The renew capability request 606 requests an extension from the server of its current license rights. This represents a situation where a device has all needed capabilities.

A server capability response is identically structured in response to either a capability request 601 or a renew capability request 606.

Figure 7A:
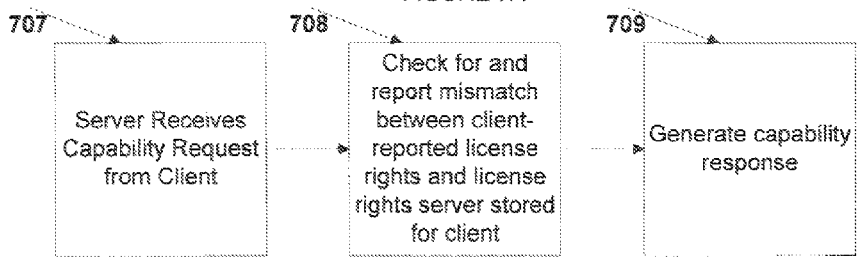
FIG. 7A illustrates an exemplary process of receiving a capability request in a capacity licensing system, according to one embodiment.

FIG. 7A illustrates an exemplary process of receiving a capability request in a capacity licensing system, according to one embodiment. A server receives a capability request from a client 707. The server checks for and reports any mismatch between client-reported license rights and the license rights stored on the server for that client 708. The server then generates a capability response 709.

Figure 7B:
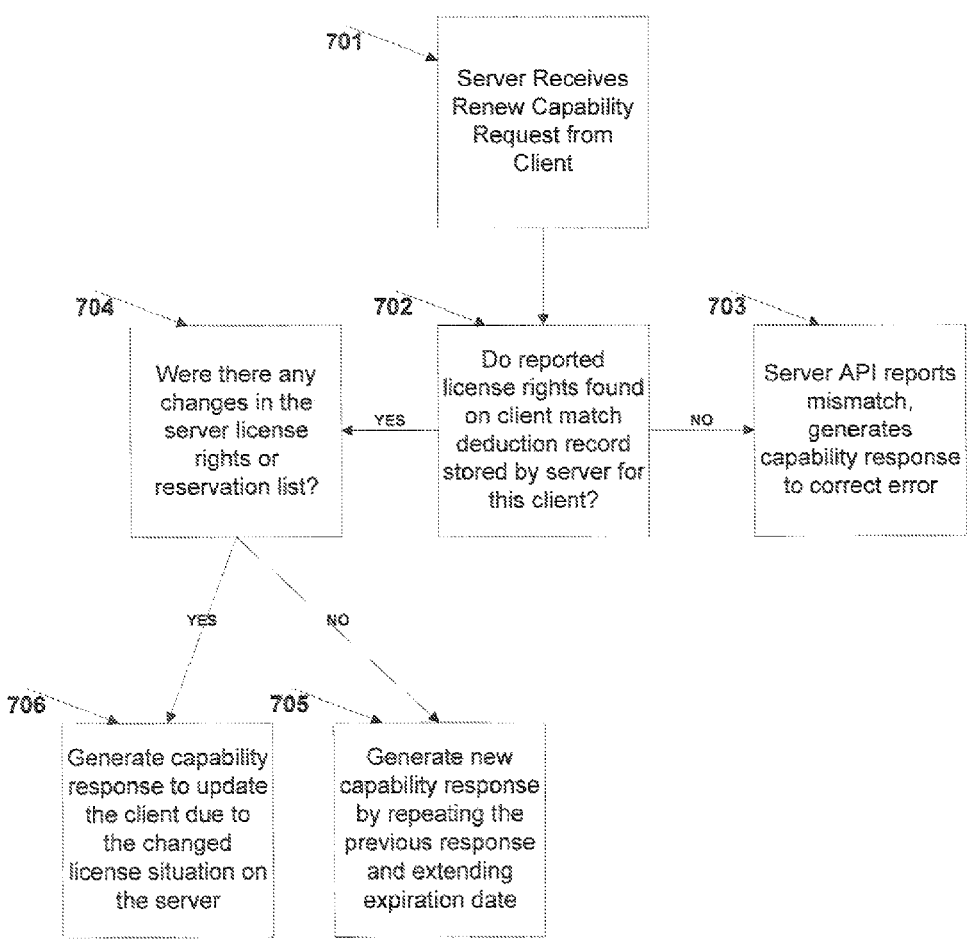
FIG. 7B illustrates an exemplary process of receiving a renew capability request in a capacity licensing system, according to one embodiment.

FIG. 7B illustrates an exemplary process of receiving a renew capability request in a capacity licensing system, according to one embodiment. A server receives a renew capability request from a client 701 and checks if the license rights reported by the client match a deduction record for the client stored by the server 702. If the license rights do not match, the server API reports the mismatch and generates a capability response to correct the error 703. According to one embodiment, rights ids and vendor data are stored in the client's deduction record.

If the reported license rights match the deduction record stored on the server, then the server checks for any changes in the server license rights or license reservation list 704. If changes are found then the server generates a capability response in order to update the client due to the changed license situation on the server 706. If no chances in server license rights are found, then the server generates a new capability response by repeating the previous response (constructing it from the deduction record) and extending the expiration date 705. According to one embodiment, the expiration date is calculated using the current time and a previously defined borrow interval. In other words, the expiration date is extended by the borrow interval.

FIG. 8 is a system level diagram of an exemplary capacity licensing system utilizing redundant controllers, according to one embodiment. A capacity licensing system 800 includes a device manufacturer 801, having a licensing back-office 802, that grants licensing rights to a customer 810 having one or more embedded systems 811. An embedded system 811 includes a device 816.

A network administrator 809 utilizes a management console 806 to access a customer portal 805 hosted by the device manufacturer 801. Through the customer portal 805 capabilities can be requested by communicating with the resource planner (ERP) 804 and submitting payment for the requested capabilities. The capabilities desired may be initial functional capabilities for the embedded system 811 and they may also be an upgrade in functionality for an already deployed embedded system 811. The resource planner (ERP) 804 communicates the entitlements for the embedded system 811 to the entitlement relationship management system (ERMS) 803.

A local licensing server 812 includes information related to policy 808, a license manager 817, a licensing micro-kernel 818, and an operating system (OS) 819. A license manager 817 and licensing micro-kernel 818 handle license rights. The local licensing server 812 also includes trusted storage 815 and a primary 813 and secondary 814 controller. The state of what licenses have been served is stored as deduction records in trusted storage 815; and this can be stored on externally replicated disks. The pool license file (licenses to be served) contains the identity of both the primary controller 813 and the secondary controller 814 so that either can server the licenses. The management console 806 communicates the pool license file to the local licensing server 812.

The device within the embedded system 811 communicates a device identity and desired capacity to the local licensing server 812, and the local licensing server 812 responds with a licensed configuration or license response based on set policy 808. The policies 808 are defined by a manufacturer or network administrator, according to one embodiment.

Figure 9:
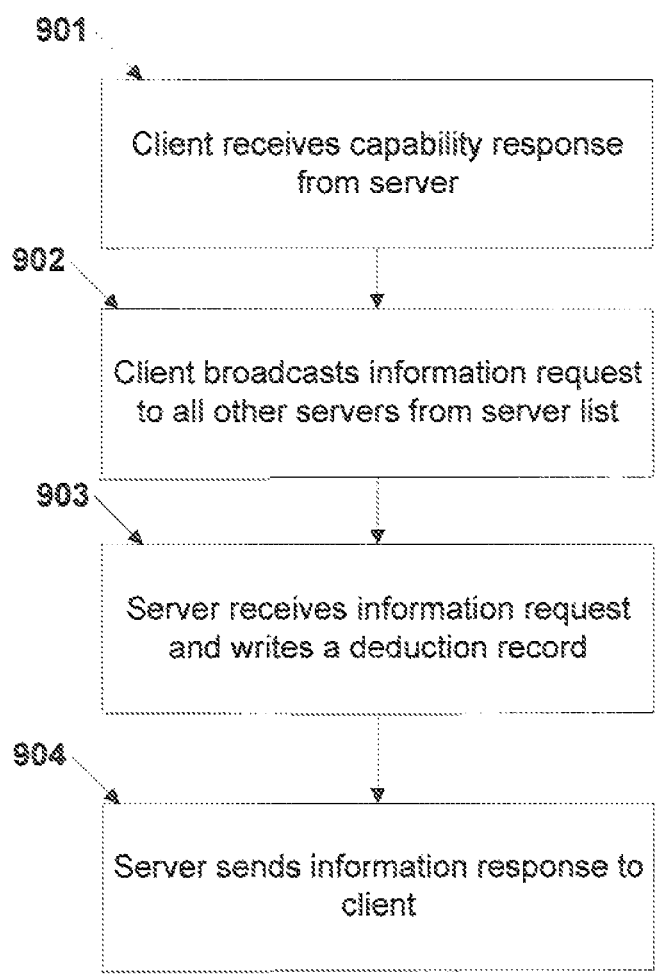
FIG. 9 illustrates an exemplary process of communicating using information requests and responses in a capacity licensing system, according to one embodiment.

FIG. 9 illustrates an exemplary process of communicating using information requests and responses in a capacity licensing system, according to one embodiment. A client receives a capability response from a server 901 and broadcasts an information request to all other servers from a server list 902. A server receives the information request 903 and writes a deduction record to trusted storage 903. The server sends an information response to the client 904. The goal of an information request is to broadcast a client's licensing state to all the servers on a server list. A server list is generated by a publisher, according to one embodiment. When a client receives a capability response from one server on the server list, the information request is sent to all other servers on the server list as to provide server fail-over support. The information request carries information about the client's current license rights in the same manner as capability request described above, according to one embodiment. An information response carries back an acknowledgement that the client's license state was recorded by the server.

Implementation of server fail-over support at the client, according to one embodiment, involves a client application being configured with the server list in the order of a license administrator's preference. The client application sends a capability request to the first server on the list, and if the server is down or not responding the client application sends a capability request to the next server on the list until a responsive server is located.

Figure 10:
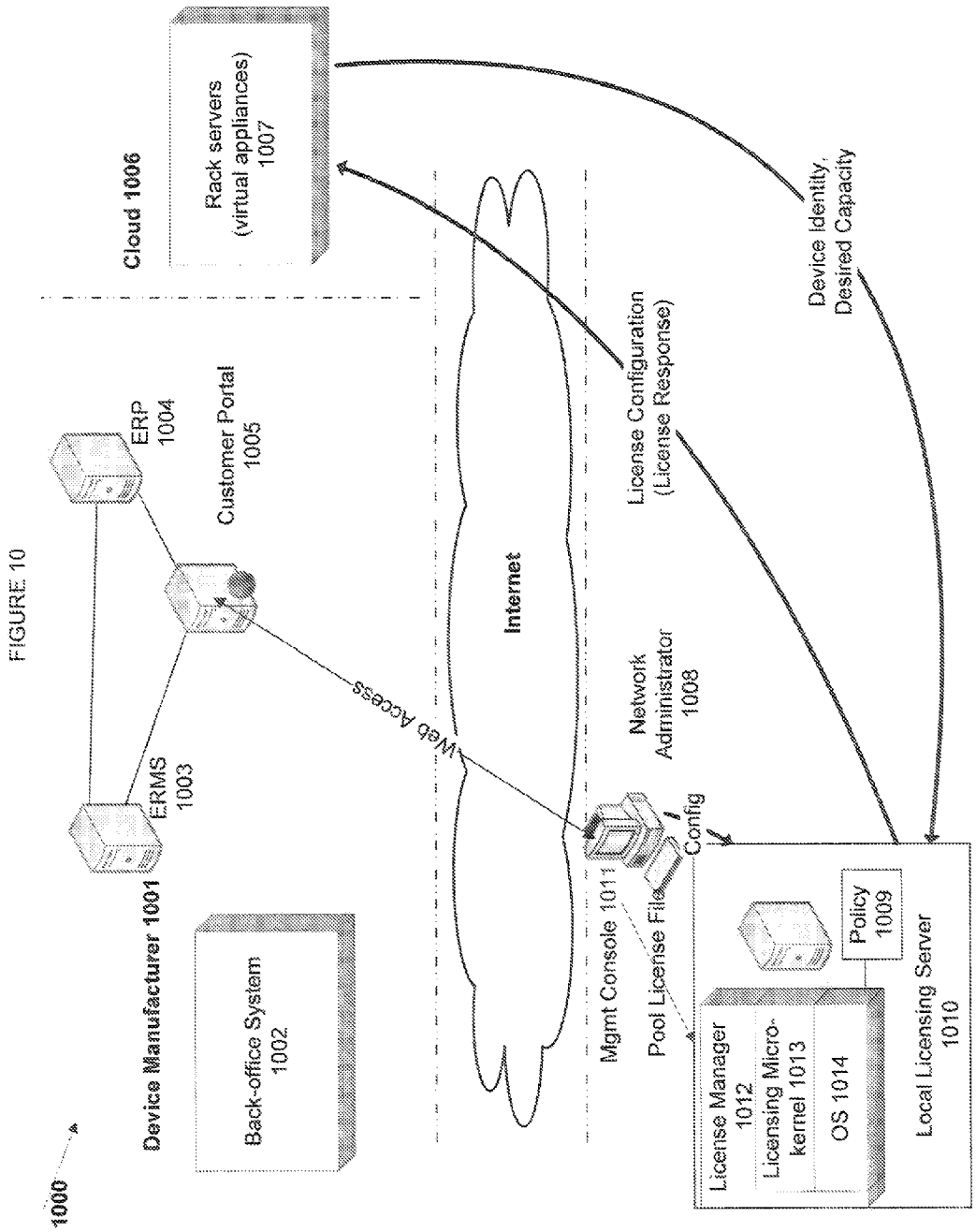
FIG. 10 is a system level diagram of an exemplary capacity licensing system utilizing virtual appliances, according to one embodiment.

FIG. 10 is a system level diagram of an exemplary capacity licensing system, according to one embodiment. A capacity licensing system 1000 includes a device manufacturer 1001, having a licensing back-office 1002, that grants licensing rights. A cloud 1006 includes rack servers and virtual appliances 1007, according to one embodiment. As described in the above description, a virtual appliance is characterized by hardware without writable memory. In a startup routine, a virtual appliance contacts a provisioning system or a licensing server 1010 to receive a configuration and licensing capabilities. The configuration and licensing capabilities are stored in the memory of the virtual appliance for the lifetime of the running instance of the virtual appliance. Upon power-down or reset, or any action that effectively erases the memory of the virtual appliance, the license capabilities are returned to the license server to be applied elsewhere. The virtual appliance also has borrow and renew intervals as defined by the manufacturer or license provider.

A network administrator 1008 utilizes a management console 1011 to access a customer portal 1005 hosted by the device manufacturer 1001. Through the customer portal 1005 capabilities can be requested by communicating with the resource planner (ERP) 1004 and submitting payment for the requested capabilities. The capabilities desired may be initial functional capabilities for the virtual appliances 1007 and they may also be an upgrade in functionality for an already deployed virtual appliance 1007. The resource planner (ERP) 1004 communicates the entitlements for the virtual appliances 1007 to the entitlement relationship management system (ERMS) 1003.

A local licensing server 1010 includes information related to policy 1009, a license manager 1012, a licensing micro-kernel 1013, and an operating system (O/S) 1014. A license manager 1012 and licensing micro-kernel 1013 handle license rights.

The management console 1011 communicates a pool license file (licenses to be served) to the local licensing server 1010.

The cloud 1006, having rack servers and virtual appliances 1007, communicates a device identity (associated with a virtual appliance) and desired capacity to the local licensing server 1010, and the local licensing server 1010 responds with a licensed configuration or license response based on set policy 1009. The policies 1009 are defined by a manufacturer or network administrator, according to one embodiment.

A method and system for capacity licensing are disclosed. It is understood that the embodiments described herein are for the purpose of elucidation and should not be considered limiting the subject matter of the present embodiments. Various modifications, uses, substitutions, recombinations, improvements, methods of productions without departing from the scope or spirit of the present invention would be evident to a person skilled in the art.

What is claimed is:

1. A method for capacity licensing, the method comprising:
Storing, in a memory of a license server, information regarding a license comprising a plurality of different license rights, wherein software governed by the license comprises a plurality of different features, each feature associated with a different license right;
receiving a capability request from a client device, the capability request indicating a license, an identity of the client device, and capability information for the client device;
executing instructions stored in the memory, wherein execution of instructions by a processor:
selects a set of license rights for the client device from the plurality of license rights associated with the license, the selection of the set of license rights based on the identity of the client device and the capability information for the client device;
verifies that the selected license rights are available under the license indicated by the capability request received from the client device, and
sending a capability response to the client device, the capability response comprising the selected set of license rights only, wherein subsequent exercise of the license by the client device is governed by the selected set of license rights and features of the software associated with the selected set of license rights, and wherein the client broadcasts current license rights comprising the selected set of license rights to a list of servers, and wherein servers on the list provide failover support based on the broadcast current license rights; and
storing a deduction record in memory, the deduction record reflecting that the selected set of license rights has been provided to the client device from a license pool, wherein an information response to an information request acknowledges the stored deduction record.

2. The method of claim 1, wherein the capability request comprises a host identifier, a timestamp, rights identifiers, and vendor data.

3. The method of claim 1, wherein the information request comprises a host identifier, a timestamp, rights identifiers, and vendor data.

4. The method of claim 1, wherein the acknowledgement further comprises an acknowledgement of receipt of the information request.

5. The method of claim 1, wherein the requesting client device transmits the information request to each server from a server list stored in memory.

6. The method of claim 1, wherein each server from a server list transmits an information response to the requesting client device, each server storing a deduction record.

7. The method of claim 1, wherein the license pool comprises licenses available for allocation.

8. The method of claim 1, wherein the license server identifies the selected set of license rights further based on a license policy.

9. The method of claim 1, wherein the identification of the selected set of license rights occurs dynamically.

10. A system for capacity licensing, the system comprising:
one or more embedded systems having one or more client devices in communication with a license server; and
the license server for managing a license pool, the license server comprising:
a memory for storing information regarding a license comprising a plurality of different license rights, wherein software governed by the license comprises a plurality of different features, each feature associated with a different license right,
a communication interface for receiving a capability request from one of the client devices, the capability request indicating a license, an identity of the client device and capability information for the client device;
a processor for executing instructions stored in the memory, wherein execution of instructions by the processor:
selects a set of license rights for the client device from the plurality of license rights associated with the license, the selection of the set of license rights based on the identity of the client device and the capability information for the client device, and verifies that the selected license rights are available under the license indicated by the capability request received from the client device, and wherein the communication interface further sends a capability response to the client device, the capability response comprising the selected set of license rights only, wherein subsequent exercise of the license by the client device is governed by the selected set of license rights and features of the software associated with the selected set of license rights, and wherein the client broadcasts current license rights comprising the selected set of license rights to a first list of servers, and wherein servers on the list provide failover support based on the broadcast current license rights; and wherein the memory further stores a deduction record in memory, the deduction record reflecting that the selected set of license rights has been provided to the client device from a license pool, wherein an information response to an information request acknowledges the stored deduction record.

11. The system of claim 10, wherein the capability request comprises a host identifier, a timestamp, rights identifiers, and vendor data.

12. The system of claim 10, wherein the information request comprises a host identifier, a timestamp, rights identifiers, and vendor data.

13. The system of claim 10, wherein acknowledging the stored deduction record further comprises an acknowledgement of receipt of the information request.

14. The system of claim 10, wherein the information request is transmitted to each server from a second list of servers including the license server.

15. The system of claim 10, wherein each server from the second list of servers transmits the information response to the requesting client device, each server storing a deduction record.

16. The system of claim 10, wherein the license server comprises a primary controller and a secondary controller.

17. The system of claim 10, wherein the requesting client device is a virtual appliance.

18. The system of claim 10, wherein the license server identifies the selected set of license rights further based on a license policy.

19. The system of claim 18, wherein the identification of the selected set of license rights occurs dynamically.

20. The system of claim 10, wherein the license server comprises a database for storing device license reservations.

21. A non-transitory computer-readable storage medium, having embodied thereon a program executable by a processor to perform a method for capacity licensing, the method comprising:

storing information regarding a license comprising a plurality of different license rights, wherein software governed by the license comprises a plurality of different features, each feature associated with a different license right;

receiving a capability request from a client device, the capability request indicating a license, an identity of the client device, and capability information for the client device;

selecting a set of license rights for the client device from the plurality of license rights associated with the license, the selection of the set of license rights based on the identity of the client device and the capability information for the client device;

verifying that the selected license rights are available under the license indicated by the capability request received from the client device;

sending a capability response to the client device, the capability response comprising the selected set of license rights only, wherein subsequent exercise of the license by the client device is governed by the selected set of license rights and features of the software associated with the selected set of license rights, wherein the client broadcasts current license rights comprising the selected set of license rights to a list of servers, and wherein servers on the list provide failover support based on the broadcast current license rights; and storing a deduction record in memory, the deduction record reflecting that the selected set of license rights has been provided to the client device from a license pool, wherein an information response to an information request acknowledges the stored deduction record.

* * * * *